US011874193B1

(12) United States Patent
Chen et al.

(10) Patent No.: US 11,874,193 B1
(45) Date of Patent: Jan. 16, 2024

(54) ICE AVALANCHE-TYPE GLACIAL LAKE OUTBURST SURGE GENERATION AND HEIGHT MEASUREMENT DEVICE

(71) Applicants: Institute of Mountain Hazards and Environment, CAS, Chengdu (CN); Sichuan Highway Planning, Survey, Design and Research Institute Ltd, Chengdu (CN)

(72) Inventors: Huayong Chen, Chengdu (CN); Yang Jia, Chengdu (CN); Tao Wang, Chengdu (CN); Jiangang Chen, Chengdu (CN)

(73) Assignees: Institute of Mountain Hazards and Environment, CAS, Chengdu (CN); Sichuan Highway Planning, Survey, Design and Research Institute Ltd, Chengdu (CN)

( * ) Notice: Subject to any disclaimer, the term of this patent is extended or adjusted under 35 U.S.C. 154(b) by 0 days.

(21) Appl. No.: 18/372,588

(22) Filed: Sep. 25, 2023

(30) Foreign Application Priority Data

Dec. 23, 2022 (CN) .......................... 202211660394.4

(51) Int. Cl.
*G01M 10/00* (2006.01)
*G09B 9/00* (2006.01)
*E02B 1/02* (2006.01)

(52) U.S. Cl.
CPC .............. *G01M 10/00* (2013.01); *E02B 1/02* (2013.01); *G09B 9/00* (2013.01)

(58) Field of Classification Search
CPC ............ G01M 10/00; G09B 9/00; E02B 1/02
See application file for complete search history.

(56) References Cited

U.S. PATENT DOCUMENTS

2006/0075356 A1* 4/2006 Faulkner ................. G06T 17/05
715/782

FOREIGN PATENT DOCUMENTS

| CN | 105788426 A | * | 7/2016 | ............ G01N 33/24 |
| CN | 113405769 A | * | 9/2021 | |

* cited by examiner

*Primary Examiner* — Paul M. West
(74) *Attorney, Agent, or Firm* — Suiter Swantz pc llo (57) ABSTRACT

Provided is an ice avalanche-type glacial lake outburst surge generation and height measurement device. A glacial lake outburst test device includes a glacial lake simulation module and an ice avalanche surge module. An impact path, an impact angle, an impact scale, an impact velocity and a landslide density of an ice avalanche slider are controlled by simulation means. During formation of ice avalanche surges, the ice avalanche slider rushes into the glacial lake at a high speed, an ice avalanche pushes water to move in a sliding direction, thus forming a first surge, then continues to move to the bottom of the lake under the inertia and discharges a certain amount of water at its back. Movement of the landslide drives surrounding water to converge quickly into the back area, thus forming a second surge. Surge waves evolve around with a water entry point as a center.

10 Claims, 6 Drawing Sheets

ICE AVALANCHE-TYPE GLACIAL LAKE OUTBURST SURGE GENERATION AND HEIGHT MEASUREMENT DEVICE

CROSS-REFERENCE TO RELATED APPLICATION

This patent application claims the benefit and priority of Chinese Patent Application No. 202211660394.4 filed with the China National Intellectual Property Administration on Dec. 23, 2022, the disclosure of which is incorporated by reference herein in its entirety as part of the present application.

TECHNICAL FIELD

The present disclosure relates to the technical field of dam breaching, and in particular to an ice avalanche-type glacial lake outburst surge generation and height measurement device.

BACKGROUND

Under the background of global warming, the storage capacity and number of glacial lakes in some alpine mountainous areas increase and outburst events occur frequently. When the moraine lakes outburst, the lake water carries a large number of moraines near the breach, valley bed and moves downstream at a high speed along valleys, endangering the life and property security of coastal and downstream residents. The existing method is to calculate and study the hazard range of debris flows in the moraine lake by collecting data on the volume of the debris flows and submerged hazard areas, the volume of the debris flows and the depths of deposition, and so on.

However, unlike the conventional landslides, the density of ice avalanche landslides is generally less than that of glacial lake water. When impacting the glacial lake, the ice avalanche landslide will float under the action of buoyancy, leading to the triggering of glacial lake surges. The ice avalanche surges will cause the overflow and breaching of the moraine dam. Existing devices have not intensively studied the formation, evolution and attenuation of surges under ice avalanche conditions and the dam breaching process and mechanism under the action of surges.

SUMMARY

The present disclosure aims at solving at least one of the technical problems existing in the prior art. To this end, an ice avalanche-type glacial lake outburst surge generation and height measurement device is provided, which is used to simulate topographic change at the bottom of a glacial lake, precipitate and collect residual mud of a moraine dam, and simulate slope channels of ice avalanche on the periphery of the glacial lake. An ice avalanche landslide is simulated through a slider with low density (0.9 kg/m$^3$), and the volume of the ice avalanche and the time when the ice avalanche impacts the glacial lake are controlled.

The present disclosure is achieved as follows.

The present disclosure provides an ice avalanche-type glacial lake outburst surge generation and height measurement device, including a glacial lake simulation module, and ice avalanche surge modules.

The glacial lake simulation module includes a glacial lake pool, an enclosure, ice avalanche pools, ice avalanche frames, and flip cylinders. The enclosure is arranged on a periphery of the glacial lake pool, and the ice avalanche pools are arranged on the periphery of the glacial lake pool. A lower end of each ice avalanche frame is rotationally connected into a corresponding ice avalanche pool. A cylinder body of each flip cylinder is rotationally connected into a corresponding ice avalanche pool, and one end of a piston rod of each flip cylinder is rotationally connected to an upper end of a corresponding ice avalanche frame. The ice avalanche surge modules each include a guide frame, ice avalanche sliders, suspension pulley frames, limit cylinders, a traction shaft, a traction motor, a traction rope, and dampers. The guide frame is lapped onto a corresponding ice avalanche frame, each ice avalanche slider slides on a surface of the ice avalanche frame, and each suspension pulley frame is arranged on a corresponding ice avalanche slider and slides on a surface of the guide frame. A cylinder body of each limit cylinder is arranged on the guide frame, one end of a piston rod of the limit cylinder faces into the suspension pulley frame. The traction shaft is rotationally connected to one end of the ice avalanche frame, a main body of the traction motor is arranged at one end of the ice avalanche frame, and the traction motor is driven to the traction shaft. One end of the traction rope is wound around a surface of the traction shaft, another end of the traction rope is fixed to one of the ice avalanche sliders. A cylinder body of each damper is arranged in a lower end of a corresponding ice avalanche slider, and one end of the piston rod of the damper faces the ice avalanche slider.

In one embodiment of the present disclosure, a lower end of the glacial lake pool is in communication with a settling pool, and a lower end of the settling pool is in communication with a discharge port.

In one embodiment of the present disclosure, a cable groove is arranged in the enclosure, and support legs are arranged on the periphery of the enclosure.

In one embodiment of the present disclosure, a baffle plate is arranged on each ice avalanche frame, and one end of the piston rod of one of the dampers faces the baffle plate.

In one embodiment of the present disclosure, ice avalanche slide rails are uniformly arranged in each ice avalanche frame, and the ice avalanche sliders slide on surfaces of ice avalanche slide rails.

In one embodiment of the present disclosure, suspension pulleys are uniformly and rotationally arranged on each suspension pulley frame, a guide slide rail is arranged on a periphery of the guide frame, and the suspension pulleys run through the guide slide rail in a sliding manner.

In one embodiment of the present disclosure, a limit clamping plate is arranged at one end of the piston rod of each limit cylinder, and faces into the suspension pulley frame.

In one embodiment of the present disclosure, a traction rope base is arranged on one of the ice avalanche sliders, and the other end of the traction rope is wound in the traction rope base.

In one embodiment of the present disclosure, chute seats are uniformly arranged on each ice avalanche slider, and the traction rope runs through the chute seats in a sliding manner.

In one embodiment, a pulling wheel is fixedly sleeved on the traction shaft, and one end of the traction rope is wound around a surface of the pulling wheel.

In one embodiment of the present disclosure, the ice avalanche-type glacial lake outburst surge generation and height measurement device further includes an outburst simulation module, and a drainage monitoring module.

The outburst simulation module includes gate stands, a cross brace, lead screws, a ring gate, and gate motors. The gate stands are lapped on the glacial lake pool, the cross brace is arranged between the gate stands, a lead screw is rotationally connected between the cross brace and each gate stand, and the ring gate runs between the gate stands in a sliding manner, and is sleeved on the surfaces of the lead screws in a transmission manner. A main body of each gate motor is arranged at an upper end of a corresponding gate stand, an output end of the gate motor is driven to a corresponding lead screw. The drainage monitoring module includes a drainage pool, drainage guide posts, a drainage door, a drainage cylinder, cameras, and pressure sensors. The drainage pool is arranged on the glacial lake pool, the drainage guide posts are arranged in the drainage pool, the drainage door is sleeved on the surfaces of the drainage guide posts in a sliding manner, and a cylinder body of the drainage cylinder is arranged on the drainage pool. One end of a piston rod of the drainage cylinder is arranged on the drainage door. The cameras are arranged on the cross brace, the enclosure and the drainage door. The pressure sensors are arranged on the enclosure and the drainage pool.

In one embodiment of the present disclosure, guide wheels are uniformly and rotationally arranged in the gate stands, the ring gate runs through the guide wheels in a sliding manner. A mounting seat is arranged on an upper end of each gate stand, and a main body of the gate motor is arranged on the mounting seat.

In one embodiment of the present disclosure, a first seat plate is lapped on a top of the drainage pool, a cylinder body of the drainage cylinder is arranged on the first seat plate. A second seat plate is fixed in the drainage pool, and the drainage guide posts are arranged between the first seat plate and the second seat plate.

In one embodiment of the present disclosure, first turntables are arranged on the cross brace, second turntables are arranged on the gate stands, and the lead screws are rotationally connected between the first turntables and the second turntables.

The present disclosure has the following beneficial effects: during the use of an ice avalanche-type glacial lake outburst surge generation and height measurement device designed through the above design, considering the real form of glacial lakes that the glacial lakes are mostly located in mountain streams and valleys, and moraine dams are located in downstream valleys and deep into the edge of glacial lakes, ice avalanche landslides generally slide into the glacial lakes through slopes on both sides of valleys and central valleys. Sliding paths of ice avalanche landslides are simulated by arranging multiple groups of ice avalanche frames, and the depth change of the glacial lake is over-simulated through the conical surface at the bottom of the glacial lake pool. By adjusting a flip angle of the ice avalanche frame through the flip cylinder, the slope of the sliding surface and the impact angle of the real ice avalanche are simulated. The sliding track of the ice avalanche slider is limited through the sliding limit of the suspension pulley and the guide slide rail. The ice avalanche slide rail is used for the sliding and supporting of the ice avalanche slider, so as to simulate the real ice avalanche landslide.

Due to the restriction of the topography of valley landslide, the actual slip speed of ice avalanche landslide is different from that in the experiment, and when a traditional skateboard slider is used for simulation, it is difficult to accurately control the speed of the slider. One end of the piston rod of the limit cylinder goes deep into the suspension pulley frame, such that the sliding of each ice avalanche slider can be limited and controlled, and the specific slip interval time of the ice avalanche slider can be mastered, and continuous sliding of the real ice avalanche landslide into the glacial lake can be simulated. A housing of the ice avalanche slider is made of thin iron sheet, and the internal of the housing is filled with diesel oil and gasoline with different densities to simulate ice cubes under natural conditions. A damper is used to reduce the collision rebound generated in the sliding impact process of the ice avalanche slider, so as to improve the stability of the experiment. One end of the traction rope is fixed to the ice avalanche slider at the lowest end, and the other end of the traction rope is wound around the traction shaft. The loosening or traction of the traction rope is controlled through the rotation of the traction motor, so as to control the sliding speed of the ice avalanche slider and simulate the impact speed of the real ice avalanche landslide. The slip of the ice avalanche slider is started through the expansion and retraction control of the limit cylinder, so as to control the impact scale of the ice avalanche landslide.

An impact path, an impact angle, an impact scale, an impact velocity and a landslide density of the ice avalanche slider are controlled by multiple simulation means. During the formation of ice avalanche surges, the ice avalanche slider rushes into the glacial lake at a high speed, the ice avalanche first pushes water to move in a sliding direction, thus forming a first surge, then the ice avalanche continues to move to the bottom of the lake under the inertia and discharges a certain amount of water at a back of the ice avalanche. The movement of the landslide drives the surrounding water to converge quickly into the back area, thus forming a second surge. Surge waves evolve around with a water entry point as the center. When arriving at the shore, the surge waves move towards a lake area by reflection, are superimposed with the subsequent surge waves, and gradually decay with time. After entering the water, the ice avalanche slider surfaces again, thereby aggravating the vibration of the water. The interaction between the landslide and water can last for a long time. The formation, evolution and attenuation law of real ice avalanche surges are accurately simulated, and a theoretical basis is provided, so as to facilitate the engineering transformation of glacial lakes in alpine mountain areas, and reduce the downstream personnel and property loss caused by moraine lake outburst.

BRIEF DESCRIPTION OF THE DRAWINGS

To describe the technical solutions in the embodiments of the present disclosure more clearly, the following briefly introduces the accompanying drawings required for describing the embodiments. It should be understood that the following drawings illustrate only some embodiments of the present disclosure and therefore should not be considered as limiting the scope. Those of ordinary skill in the art may still derive other drawings from these accompanying drawings without creative efforts.

REFERENCE NUMERALS

100—glacial lake simulation module: 110—glacial lake pool; 111—settling pool; 112—discharge port; 120—enclosure: 121—cable groove; 122—support leg: 130—ice avalanche pool: 140—ice avalanche frame; 141—baffle plate; 142—ice avalanche slide rail; 150—flip cylinder: 300—ice avalanche surge module: 310—guide frame: 311—guide slide rail; 320—ice avalanche slider: 321—traction rope base: 322—chute seat: 330—suspension pulley frame; 331—suspension pulley: 340—limit cylinder: 341—limit clamping plate: 350—traction shaft; 351—pulling wheel: 360—traction motor; 370—traction rope: 380—damper: 500—outburst simulation module: 510—gate stand: 511—guide wheel; 512—mounting seat: 513—second turntable: 520—cross brace; 521—first turntable; 530—lead screw; 540—ring gate; 550—gate motor: 700—drainage monitoring module; 710—drainage pool: 711—first seat plate; 712—second seat plate; 720—drainage guide post: 730—drainage door; 740—drainage cylinder; 750—camera; 760—pressure sensor.

DETAILED DESCRIPTION OF THE EMBODIMENTS

The technical solutions in embodiments of the present disclosure will be described below in conjunction with accompanying drawings in the embodiments of the present disclosure.

In order to make the objectives, technical solutions and advantages of the embodiments of the present disclosure more clearly, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiment

As shown in FIG. 1 through FIG. 6, a glacial lake outburst test device according to an embodiment of the present disclosure includes a glacial lake simulation module 100, ice avalanche surge modules 300, an outburst simulation module 500, and a drainage monitoring module 700. The ice avalanche surge modules 300 are installed on the glacial lake simulation module 100, the outburst simulation module 500 is installed on the glacial lake simulation module 100, and the drainage monitoring module 700 is installed on the glacial lake simulation module 100. The glacial lake simulation module 100 is used to simulate topographic change at the bottom of a glacial lake, precipitate and collect residual mud of a moraine dam, and simulate slope channels of ice avalanche on the periphery of the glacial lake. The ice avalanche surge module 300 is used to simulate an ice avalanche landslide through a slider with low density and control the volume of the ice avalanche and the time when the ice avalanche impacts the glacial lake. The outburst simulation module 500 is used to facilitate the stacking of a circumferential moraine dam and the impact of circumferential surges on the moraine dam through the opening and closing of a gate. The drainage monitoring module 700 is used to record the change process of the surge height and dam breaching, and to simulate downstream valley channels of the moraine dam.

As shown in FIG. 2 through FIG. 6, unlike the conventional landslide-debris flow, the density of the ice avalanche landslide is generally less than that of glacial lake water. When impacting the glacial lake, the ice avalanche landslide floats under the action of buoyancy to cause the excitation of glacial lake surges, and the ice avalanche surges may cause the overflow and breaching of the moraine dam. Existing devices have not intensively studied the formation, evolution and attenuation of surges under ice avalanche excitation conditions and the dam breaching process and mechanism under the action of surges.

Figure 2:
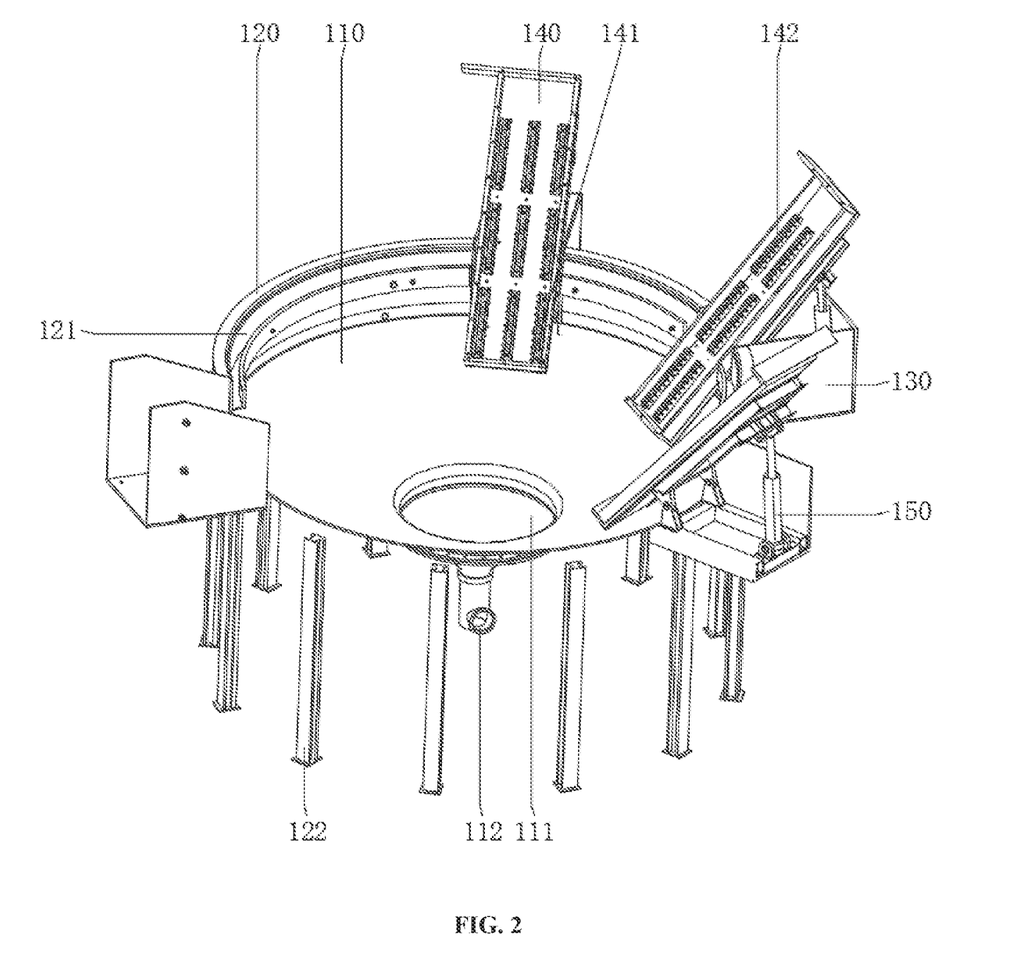
FIG. 2 is a three-dimensional structural schematic diagram of a glacial lake simulation module in accordance with an embodiment of the present disclosure.
Figure 6:
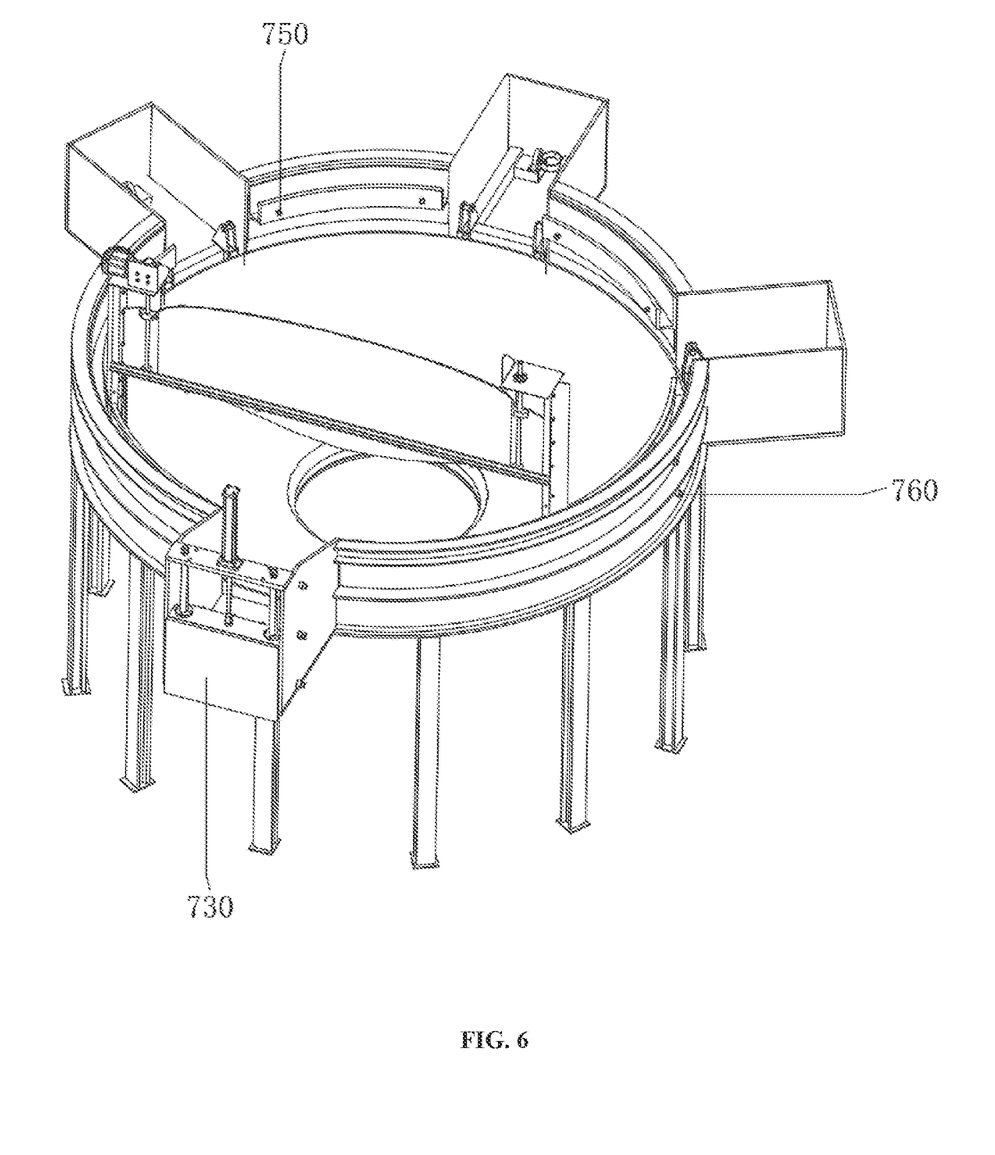
FIG. 6 is a three-dimensional structural schematic diagram of a glacial lake simulation module in accordance with an embodiment of the present disclosure.

The glacial lake simulation module 100 includes a glacial lake pool 110, an enclosure 120, ice avalanche pools 130, ice avalanche frames 140, and flip cylinders 150. The enclosure 120 is arranged on a periphery of the glacial lake pool 110, and welded to the glacial lake pool 110. A lower end of the glacial lake pool 110 is in communication with a settling pool 111, and the glacial lake pool 110 is welded to the settling pool 111. The settling pool 111 is used to precipitate and recover mud generated by a moraine dam. A lower end of the settling pool 111 is in communication with a discharge port 112, and the discharge port 112 is welded to the settling pool 111 to facilitate the discharge of the mud and water. A cable groove 121 is provided in the enclosure 120 to facilitate the arrangement of cables, and support legs 122 are provided on a periphery of the enclosure 120, and bolted to the enclosure 120. The ice avalanche pools 130 are arranged on a periphery of the glacial lake pool 110, and welded to the glacial lake pool 110. A lower end of each ice avalanche frame 140 is rotationally connected into a corresponding ice avalanche pool 130, and the ice avalanche frame 140 is in pin connection with the ice avalanche pool 130. A cylinder body of each flip cylinder 150 is rotationally connected into a corresponding ice avalanche pool 130, and the flip cylinder 150 is in pin connection with the ice avalanche pool 130. One end of a piston rod of each flip cylinder 150 is rotationally connected to an upper end of a corresponding ice avalanche frame 140, and the flip cylinder 150 is in pin connection with the ice avalanche frame 140.

Figure 3:
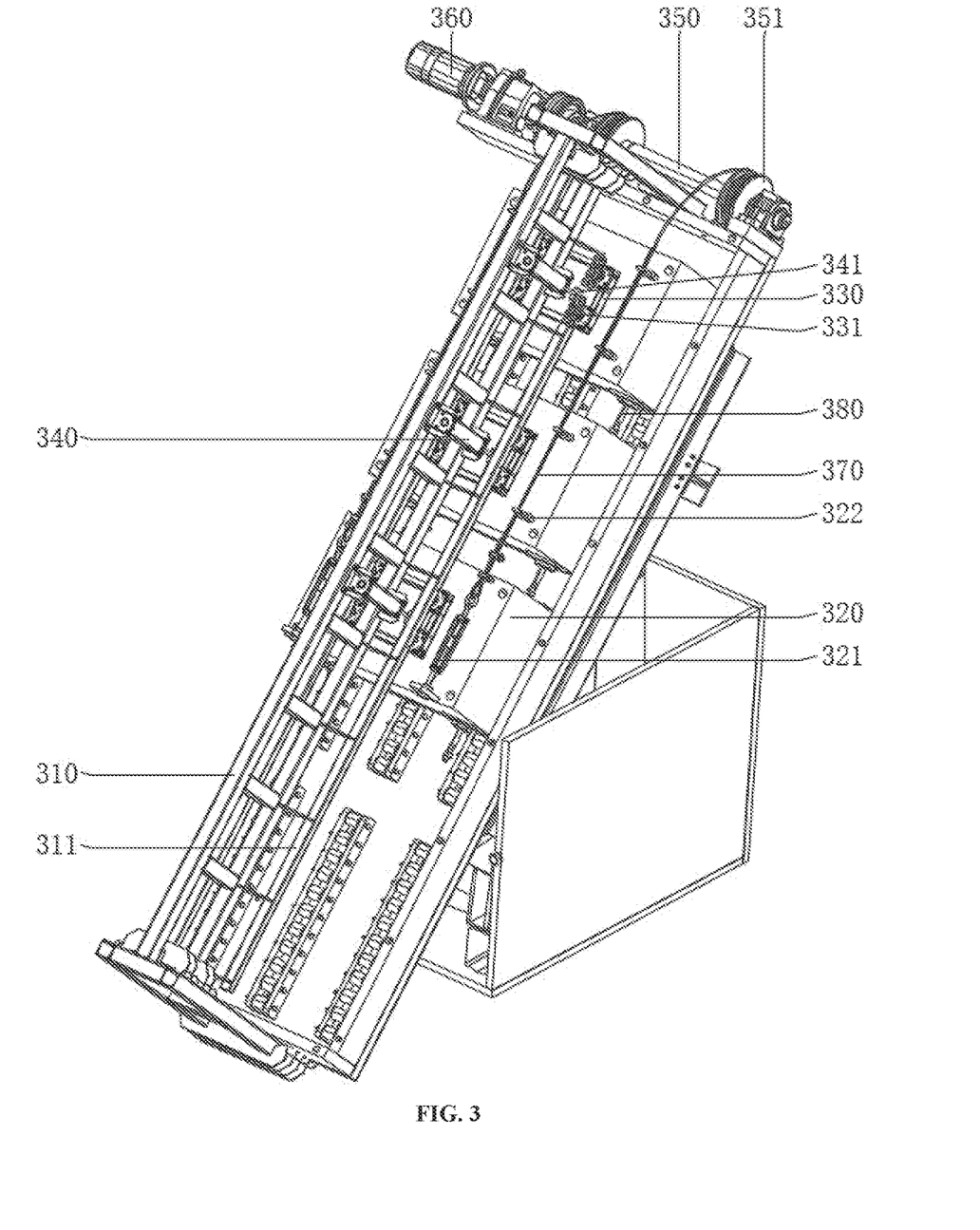
FIG. 3 is a three-dimensional structural schematic diagram of an ice avalanche surge module in accordance with an embodiment of the present disclosure.

The ice avalanche surge modules 300 each include a guide frame 310, ice avalanche sliders 320, suspension pulley frames 330, limit cylinders 340, a traction shaft 350, a traction motor 360, a traction rope 370, and dampers 380. The guide frame 310 is lapped onto a corresponding ice avalanche frame 140, and bolted to the ice avalanche frame 140. Each ice avalanche slider 320 slides on a surface of the ice avalanche frame 140. Ice avalanche slide rails 142 are uniformly arranged in the ice avalanche frame 140. The ice avalanche slider 320 slides on the surfaces of the ice avalanche slide rails 142, and specifically, the ice avalanche slide rails 142 are bolted to the ice avalanche frame 140. Roller shafts are rotationally arranged on the ice avalanche slide rails 142, and the ice avalanche sliders 320 slide on surfaces of the roller shafts. Each suspension pulley frame 330 is arranged on a corresponding ice avalanche slider 320, and bolted to the ice avalanche slider 320. The suspension pulley frame 330 slides on a surface of the guide frame 310, suspension pulleys 331 are uniformly and rotationally arranged on the suspension pulley frame 330, and the suspension pulleys 331 are in bearing connection with the suspension pulley frame 330. A guide slide rail 311 is arranged on a periphery of the guide frame 310, and the guide slide rail 311 is welded to the guide frame 310. The suspension pulleys 331 run through the guide slide rail 311 in a sliding manner.

A cylinder body of each limit cylinder 340 is arranged on the guide frame 310, and the limit cylinder 340 is bolted to the guide frame 310. One end of a piston rod of the limit cylinder 340 faces into the suspension pulley frame 330, a limit clamping plate 341 is arranged at one end of the piston rod of the limit cylinder 340, and threaded to the limit cylinder 340. The limit clamping plate 341 faces into the suspension pulley frame 330, and specifically used to limit the slide of the ice avalanche slider 320 and control the sliding time of the ice avalanche slider 320. The traction shaft 350 is rotationally connected to one end of the ice avalanche frame 140, and the traction shaft 350 is in bearing connection with the ice avalanche frame 140. A main body of the traction motor 360 is arranged at one end of the ice avalanche frame 140, and the traction motor 360 is bolted to the ice avalanche frame 140. The traction motor 360 is driven to the traction shaft 350, and coupled to the traction shaft 350. One end of the traction rope 370 is wound around a surface of the traction shaft 350, a pulling wheel 351 is fixedly sleeved on the traction shaft 350, and the pulling wheel 351 is keyed to the traction shaft 350. One end of the traction rope 370 is wound around a surface of the pulling wheel 351, and the other end of the traction rope 370 is fixed to one ice avalanche sliders 320.

A traction rope base 321 is arranged at one ice avalanche slider 320, and welded to the ice avalanche slider 320. The other end of the traction rope 370 is wound in the traction rope base 321. Chute seats 322 are uniformly arranged on the ice avalanche slider 320, and welded to the ice avalanche slider 320. The traction rope 370 runs through the chute seats 322 in a sliding manner to facilitate the linkage of the ice avalanche slider 320. A cylinder body of the damper 380 is arranged in a lower end of the ice avalanche slider 320, and the damper 380 is threaded to the ice avalanche slider 320. One end of a piston rod of the damper 380 faces the ice avalanche slider 320, so as to reduce collision vibration between the ice avalanche sliders 320. A baffle plate 141 is arranged on the ice avalanche frame 140, and bolted to the ice avalanche frame 140. One end of a piston rod of one damper 380 faces the baffle plate 141, so as to reduce the collision vibration between the ice avalanche slider 320 and the ice avalanche frame 140.

Considering the real form of glacial lakes that the glacial lakes are mostly located in mountain streams and valleys, and moraine dams are located in downstream valleys and deep into the edge of glacial lakes, ice avalanche landslides generally slide into the glacial lake through slopes on both sides of valleys and central valleys. Sliding paths of ice avalanche landslides are simulated by arranging multiple groups of ice avalanche frames 140, and the depth change of the glacial lake is over-simulated through the conical surface at the bottom of the glacial lake pool 110. By adjusting a flip angle of the ice avalanche frame 140 through the flip cylinder 150, the slope of the sliding surface and the impact angle of the real ice avalanche are simulated. The sliding track of the ice avalanche slider 320 is limited through the sliding limit of the suspension pulley 331 and the guide slide rail 311. The ice avalanche slide rail 142 is used for the sliding and supporting of the ice avalanche slider 320, so as to simulate the real ice avalanche landslide.

Due to the restriction of the topography of valley landslide, the actual slip speed of ice avalanche landslide is different from that in the experiment, and when the traditional skateboard slider is used for simulation, it is difficult to accurately control the speed of the slider. One end of the piston rod of the limit cylinder 340 goes deep into the suspension pulley frame 330, such that the sliding of each ice avalanche slider 320 can be limited and controlled, the specific slip interval time of the ice avalanche slider 320 can be mastered, and continuous sliding of the real ice avalanche landslide into the glacial lake can be simulated. A housing of the ice avalanche slider 320 is made of thin iron sheet, and the internal of the housing is filled with diesel oil and gasoline with different densities to simulate ice cubes under natural conditions. The damper 380 is used to reduce the collision rebound generated in the sliding impact process of the ice avalanche slider 320, so as to improve the stability of the experiment. One end of the traction rope 370 is fixed to the ice avalanche slider 320 at the lowest end, and the other end of the traction rope 370 is wound around the traction shaft 350. The loosening or traction of the traction rope 370 is controlled through the rotation of the traction motor 360, so as to control the sliding speed of the ice avalanche slider 320 and simulate the impact speed of the real ice avalanche landslide. The slip of the ice avalanche slider is started through the expansion and retraction control of the limit cylinder 340, so as to control the impact scale of the ice avalanche landslide.

An impact path, an impact angle, an impact scale, an impact velocity and a landslide density of the ice avalanche slider 320 are controlled by multiple simulation means. During the formation of ice avalanche surges, the ice avalanche slider 320 rushes into the glacial lake at a high speed, the ice avalanche first pushes water to move in a sliding direction, thus forming a first surge, then the ice avalanche continues to move to the bottom of the lake under the inertia and discharges a certain amount of water at the back of the ice avalanche. The movement of the landslide drives the surrounding water to converge quickly into the back area, thus forming a second surge. Surge waves evolve around with a water entry point as the center. When arriving at the shore, the surge waves move towards a lake area by reflection, are superimposed with the subsequent surge waves, and gradually decay with time. After entering the water, the ice avalanche slider 320 surfaces again, which aggravates the vibration of the water. The interaction between the landslide and water can last for a long time. The formation, evolution and attenuation law of real ice avalanche surges are accurately simulated, and a theoretical basis is provided, so as to facilitate the engineering transformation of glacial lakes in alpine mountain areas, and reduce the downstream personnel and property loss caused by moraine lake outburst.

Figure 4:
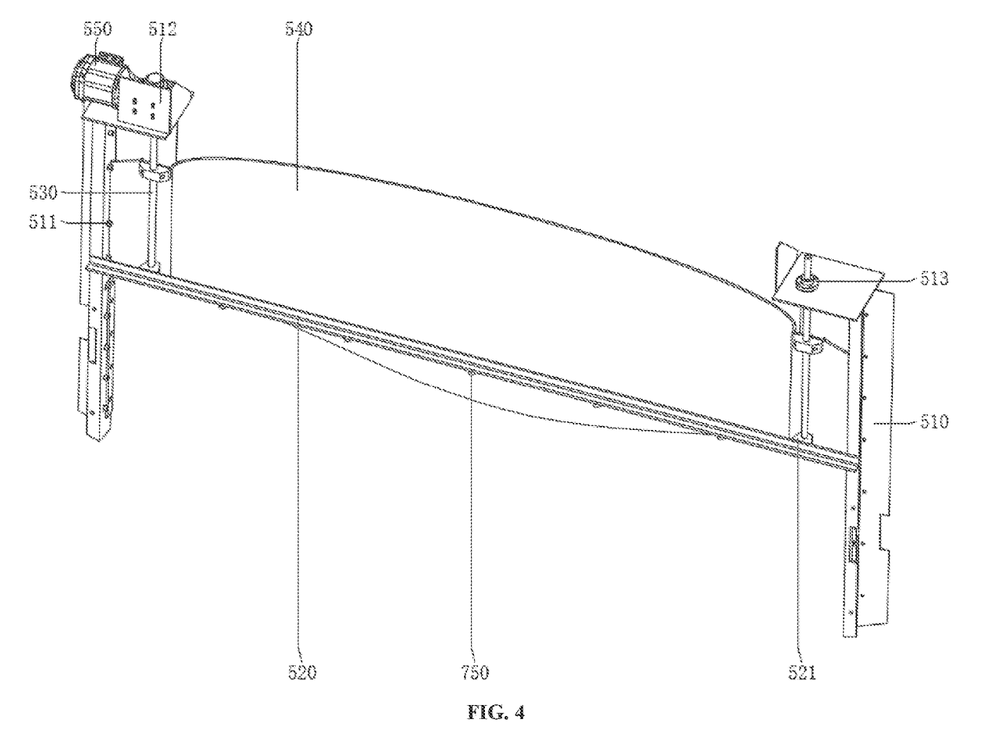
FIG. 4 is a three-dimensional structural schematic diagram of an outburst simulation module in accordance with an embodiment of the present disclosure.

The outburst simulation module 500 includes gate stands 510, a cross brace 520, lead screws 530, a ring gate 540, and gate motors 550. The gate stands 510 are lapped on the glacial lake pool 110, and welded to the glacial lake pool 110. The cross brace 520 is arranged between the gate stands 510, and welded to the gate stands 510. A lead screw 530 is rotationally connected between the cross brace 520 and each gate stand 510. First turntables 521 are arranged on the cross brace 520, and bolted to the cross brace 520. The first turntables 521 are rotationally connected to the cross brace 520, and are in bearing connection with the cross brace 520. Second turntables 513 are arranged on the gate stands 510, and bolted to the gate stands 510. The lead screws 530 are rotationally connected between the first turntables 521 and the second turntables 513. The ring gate 540 runs between the gate stands 510 in a sliding manner. Guide wheels 511 are uniformly and rotationally arranged in the gate stands 510, and are in bearing connection with the gate stands 510. The ring gate 540 runs through the guide wheels 511 in a sliding manner. The ring gate 540 is sleeved on the surfaces of the lead screws 530 in a transmission manner, and specifically connected to the lead screws 530 through a nut pair.

A main body of each gate motor 550 is arranged at an upper end of a corresponding gate stand 510, a mounting seat 512 is arranged at an upper end of the gate stand 510, and welded to the gate stand 510. The motor body of the gate motor 550 is arranged on the mounting seat 512, and the gate motor 550 is bolted to the mounting seat 512. An output end of the gate motor 550 is driven to a corresponding lead screw 530, and the gate motor 550 is coupled to the lead screw 530.

Figure 5:
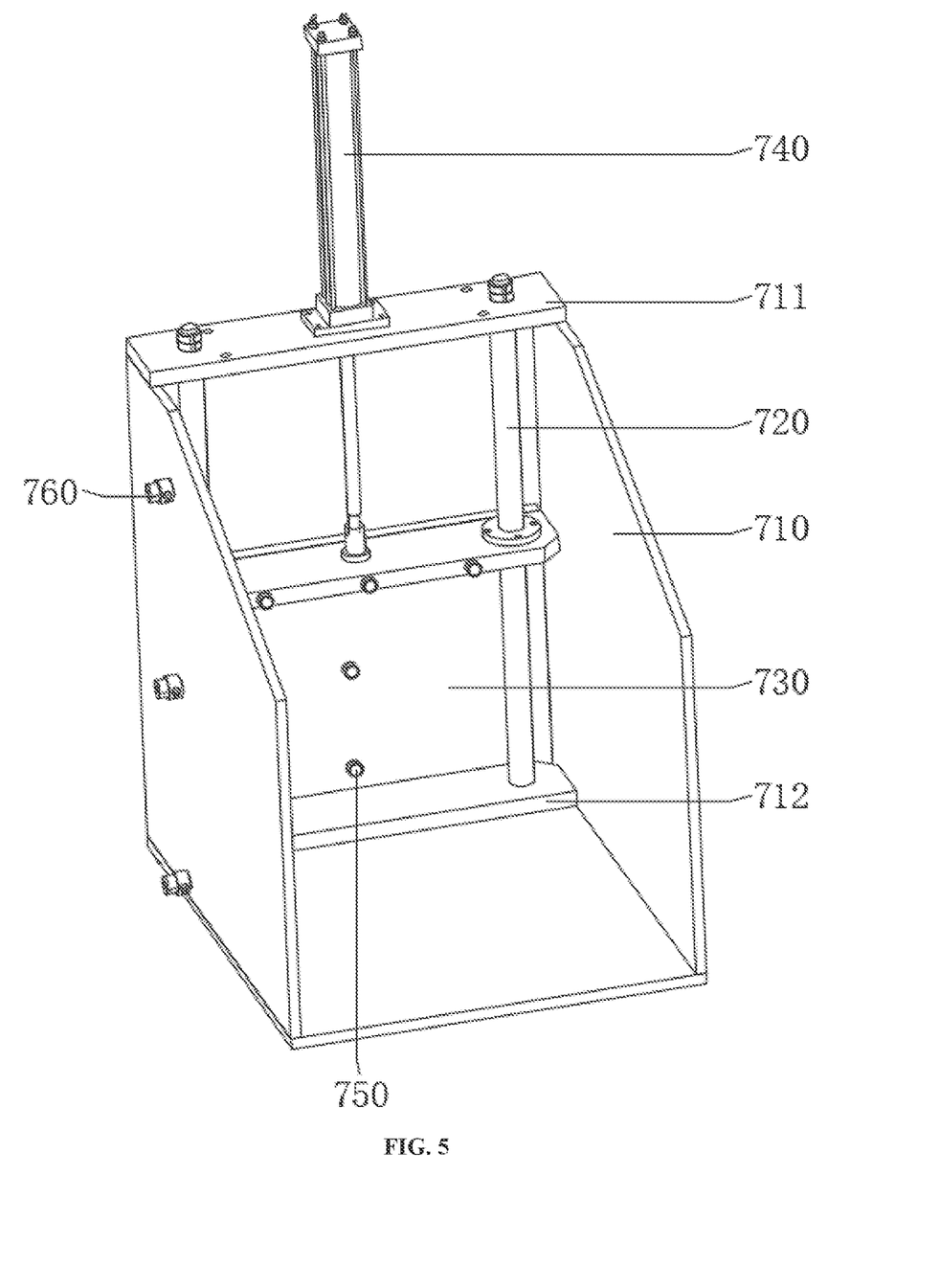
FIG. 5 is a three-dimensional structural schematic diagram of a drainage monitoring module in accordance with an embodiment of the present disclosure.

The drainage monitoring module 700 includes a drainage pool 710, drainage guide posts 720, a drainage door 730, a drainage cylinder 740, cameras 750, and pressure sensors 760. The drainage pool 710 is arranged on the glacial lake pool 110, and welded to the glacial lake pool 110. The drainage guide posts 720 are arranged in the drainage pool 710. A first seat plate 711 is lapped on a top of the drainage pool 710, and welded to the drainage pool 710. A second seat plate 712 is fixed inside the drainage pool 710, and welded to the drainage pool 710. The drainage guide posts 720 are arranged between the first seat plate 711 and the second seat plate 712 and specifically locked by a nut. The drainage door 730 is sleeved on surfaces of the drainage guide posts 720 in a sliding manner, specifically through a guide sleeve. A cylinder body of the drainage cylinder 740 is arranged on the drainage pool 710 and on the first seat plate 711, and the drainage cylinder 740 is bolted to the first seat plate 711. One end of a piston rod of the drainage cylinder 740 is arranged on the drainage door 730, and the drainage cylinder 740 is bolted to the drainage door 730.

The cameras 750 are arranged on and bolted to the cross brace 520, the enclosure 120 and the drainage door 730, so as to record the change process of dam breaching. The pressure sensors 760 are arranged on the enclosure 120 and the drainage pool 710, and threaded to the enclosure 120 and the drainage pool 710 by tapes for sealing, so as to record the height of the surges.

As a moraine lake dam is generally composed of loose moraine, permafrost, buried ice, etc., and the dam is embedded into the edge of the glacial lake, the surge impact on the dam is not limited to frontal surge impact, but surge impact around the edge of the glacial lake. In the past dam experiments, the dam was arranged straight through the box, and thus was subjected to surges in a single direction. The opening/closing of the ring gate 540 is controlled by the gate motors 550, and water in the ring gate 540 is pumped out to facilitate the stacking of a circumferential moraine dam at the edge of the glacial lake pool 110. Raw materials for the moraine dam experiments are taken from viscous debris flow deposits which replace ice structures in the moraine, and non-conforming particles are removed by a screen, for comparison with the particle size of actual moraine dam particles. The opening of the drainage door 730 is controlled by the drainage cylinder 740, and the drainage pool 710 is used to simulate downstream valley channels. Through the above structure and the pressure sensors 760, the influence of the impact paths, impact angles, impact scales, impact velocities and landslide densities of different ice avalanche sliders 320 on the formation height and impact force of the glacial lake surges is studied, and the influence law of the ice avalanche surges on the breaching process of the moraine dam without or with overflow is simulated. The change rule of a breach breadth of dam breaching is recorded by the cameras 750, and the dynamic process and mechanism of the dam breaching can be further analyzed by observing the form and expansion rate of the breach change. In-depth study on the formation, evolution, attenuation law of surges under ice avalanche excitation conditions and the dam breaching process and mechanism under the action of surges facilitates the engineering transformation of glacial lakes in alpine mountain areas, and reduces the downstream personnel and property loss caused by moraine lake outburst.

Figure 1:
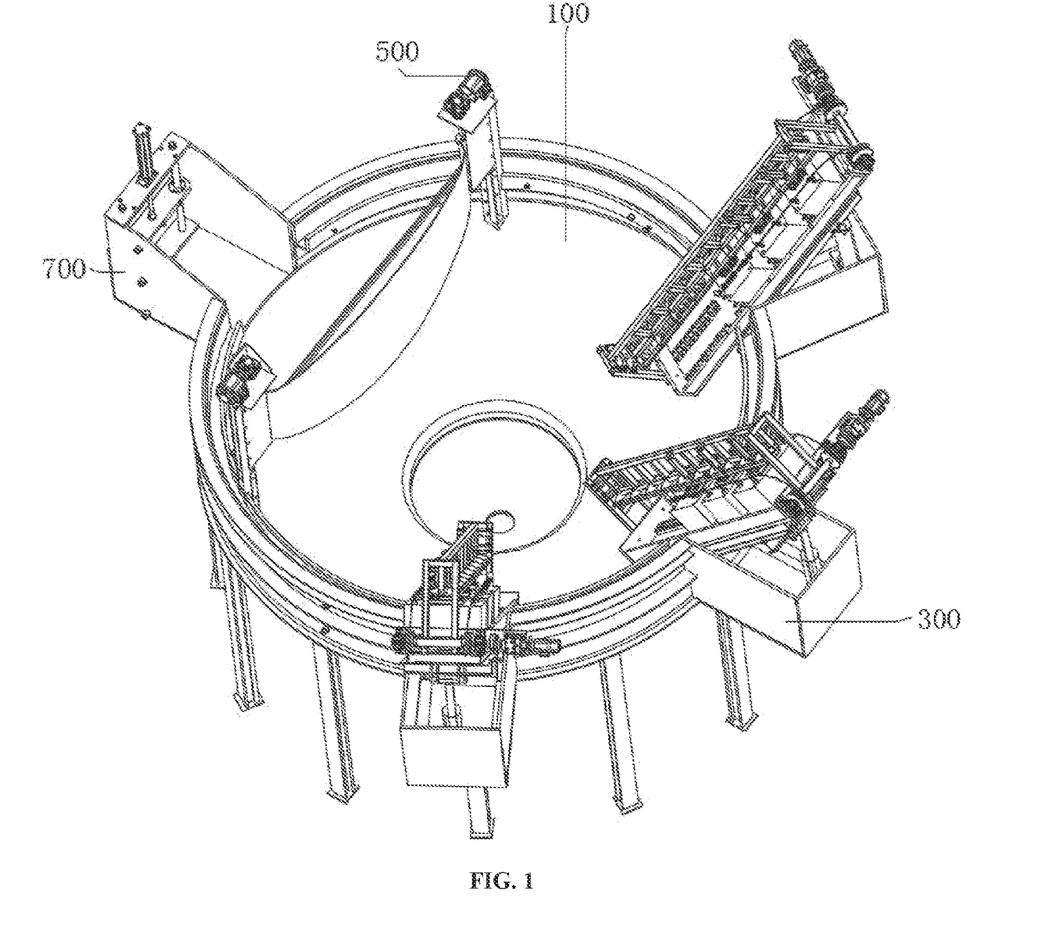
FIG. 1 is a three-dimensional structural schematic diagram of a glacial lake outburst test device in accordance with an embodiment of the present disclosure.

Specifically, an operating principle of the glacial lake outburst test device is as follows. Considering the real form of glacial lakes that the glacial lakes are mostly located in mountain streams and valleys, and moraine dams are located in downstream valleys and deep into the edge of glacial lakes, ice avalanche landslides generally slide into the glacial lake through slopes on both sides of valleys and central valleys. Sliding paths of ice avalanche landslides are simulated by arranging multiple groups of ice avalanche frames 140, and the depth change of the glacial lake is over-simulated through the conical surface at the bottom of the glacial lake pool 110. By adjusting a flip angle of the ice avalanche frame 140 through the flip cylinder 150, the slope of the sliding surface and the impact angle of the real ice avalanche are simulated. The sliding track of the ice avalanche slider 320 is limited through the sliding limit of the suspension pulley 331 and the guide slide rail 311. The ice avalanche slide rail 142 is used for the sliding and supporting of the ice avalanche slider 320, so as to simulate the real ice avalanche landslide.

Due to the restriction of the topography of valley landslide, the actual slip speed of ice avalanche landslide is different from that in the experiment, and when the traditional skateboard slider is used for simulation, it is difficult to accurately control the speed of the slider. One end of the piston rod of the limit cylinder 340 goes deep into the suspension pulley frame 330, such that the sliding of each ice avalanche slider 320 can be limited and controlled, the specific slip interval time of the ice avalanche slider 320 can be mastered, and continuous sliding of the real ice avalanche landslide into the glacial lake can be simulated. A housing of the ice avalanche slider 320 is made of thin iron sheet, and the internal of the housing is filled with diesel oil and gasoline with different densities to simulate ice cubes under natural conditions. The damper 380 is used to reduce the collision rebound generated in the sliding impact process of the ice avalanche slider 320, so as to improve the stability of the experiment. One end of the traction rope 370 is fixed to the ice avalanche slider 320 at the lowest end, and the other end of the traction rope 370 is wound around the traction shaft 350. The loosening or traction of the traction rope 370 is controlled through the rotation of the traction motor 360, so as to control the sliding speed of the ice avalanche slider 320 and simulate the impact speed of the real ice avalanche landslide. The slip of the ice avalanche slider is started through the expansion and retraction control of the limit cylinder 340, so as to control the impact scale of the ice avalanche landslide.

An impact path, an impact angle, an impact scale, an impact velocity and a landslide density of the ice avalanche slider 320 are controlled by multiple simulation means.

During the formation of ice avalanche surges, the ice avalanche slider 320 rushes into the glacial lake at a high speed, the ice avalanche first pushes water to move in a sliding direction, thus forming a first surge, then the ice avalanche continues to move to the bottom of the lake under the inertia and discharges a certain amount of water at the back of the ice avalanche. The movement of the landslide drives the surrounding water to converge quickly into the back area, thus forming a second surge. Surge waves evolve around with a water entry point as the center. When arriving at the shore, the surge waves move towards a lake area by reflection, are superimposed with the subsequent surge waves, and gradually decay with time. After entering the water, the ice avalanche slider 320 surfaces again, which aggravates the vibration of the water. The interaction between the landslide and water can last for a long time. The formation, evolution and attenuation law of real ice avalanche surges are accurately simulated, and a theoretical basis is provided, so as to facilitate the engineering transformation of glacial lakes in alpine mountain areas, and reduce the downstream personnel and property loss caused by moraine lake outburst.

Further, as a moraine lake dam is generally composed of loose moraine, permafrost, buried ice, etc., and the dam is embedded into the edge of the glacial lake, the surge impact on the dam is not limited to frontal surge impact, but surge impact around the edge of the glacial lake. In the past dam experiments, the dam was arranged straight through the box, and thus was subjected to surges in a single direction. The opening/closing of the ring gate 540 is controlled by the gate motors 550, and water in the ring gate 540 is pumped out to facilitate the stacking of a circumferential moraine dam at the edge of the glacial lake pool 110. Raw materials for the moraine dam experiments are taken from viscous debris flow deposits which replace ice structures in the moraine, and non-conforming particles are removed by a screen, for comparison with the particle size of actual moraine dam particles. The opening of the drainage door 730 is controlled by the drainage cylinder 740, and the drainage pool 710 is used to simulate downstream valley channels. Through the above structure and the pressure sensors 760, the influence of the impact paths, impact angles, impact scales, impact velocities and landslide densities of different ice avalanche sliders 320 on the formation height and impact force of the glacial lake surges is studied, and the influence law of the ice avalanche surges on the breaching process of the moraine dam without or with overflow is simulated. The change rule of a breach breadth of dam breaching is recorded by the cameras 750, and the dynamic process and mechanism of the dam breaching can be further analyzed by observing the form and expansion rate of the breach change. In-depth study on the formation, evolution, attenuation law of surges under ice avalanche excitation conditions and the dam breaching process and mechanism under the action of surges facilitates the engineering transformation of glacial lakes in alpine mountain areas, and reduces the downstream personnel and property loss caused by moraine lake outburst.

It should be noted that specific models and specifications of the flip cylinder 150, the limit cylinder 340, the traction motor 360, the gate motor 550, the drainage cylinder 740, the camera 750 and the pressure sensor 760 need to be selected and determined according to the actual specifications of the device, and the specific selection calculation method adopts the prior art in the field, and thus will not be described in detail.

The power supply and the principle thereof for the flip cylinder 150, the limit cylinder 340, the traction motor 360, the gate motor 550, the drainage cylinder 740, the camera 750 and the pressure sensor 760 are clear to those skilled in the art and will not be described in detail herein.

The above description is only embodiments of the present disclosure and not intended to limit the scope of protection of the present disclosure. For those of ordinary skill in the art, various modifications and changes may be made to the present disclosure. Any modification, equivalent replacement, improvement, etc. made within the spirit and principles of the present disclosure should be included within the scope of protection of the present disclosure. It should be noted that like numerals and letters denote like items in the following drawings, and therefore, once an item is defined in one drawing, it does not need to be further defined and explained in subsequent drawings.

What is claimed is:

1. An ice avalanche-type glacial lake outburst surge generation and height measurement device, comprising:
    a glacial lake simulation module (100), comprising a glacial lake pool (110), an enclosure (120), ice avalanche pools (130), ice avalanche frames (140), and flip cylinders (150), wherein the enclosure (120) is arranged on a periphery of the glacial lake pool (110), the ice avalanche pools (130) are arranged on the periphery of the glacial lake pool (110), a lower end of each ice avalanche frame (140) is rotationally connected into a corresponding ice avalanche pool (130), a cylinder body of each flip cylinder (150) is rotationally connected into a corresponding ice avalanche pool (130), and one end of a piston rod of each flip cylinder (150) is rotationally connected to an upper end of a corresponding ice avalanche frame (140); and
    ice avalanche surge modules (300), each comprising a guide frame (310), ice avalanche sliders (320), suspension pulley frames (330), limit cylinders (340), a traction shaft (350), a traction motor (360), a traction rope (370), and dampers (380), wherein the guide frame (310) is lapped onto a corresponding ice avalanche frame (140), each ice avalanche slider (320) slides on a surface of the ice avalanche frame (140), each suspension pulley frame (330) is arranged on a corresponding ice avalanche slider (320) and slides on a surface of the guide frame (310), a cylinder body of each limit cylinder (340) is arranged on the guide frame (310), one end of a piston rod of the limit cylinder (340) faces into the suspension pulley frame (330), the traction shaft (350) is rotationally connected to one end of the ice avalanche frame (140), a main body of the traction motor (360) is arranged at one end of the ice avalanche frame (140), the traction motor (360) is driven to the traction shaft (350), one end of the traction rope (370) is wound around a surface of the traction shaft (350), an other end of the traction rope (370) is fixed to one of the ice avalanche sliders (320), a cylinder body of each damper (380) is arranged in a lower end of a corresponding ice avalanche slider (320), and one end of the piston rod of the damper (380) faces the ice avalanche slider (320).

2. The ice avalanche-type glacial lake outburst surge generation and height measurement device according to claim 1, wherein a lower end of the glacial lake pool (110) is in communication with a settling pool (111), and a lower end of the settling pool (111) is in communication with a discharge port (112).

3. The ice avalanche-type glacial lake outburst surge generation and height measurement device according to claim 1, wherein a cable groove (121) is arranged in the enclosure (120), and support legs (122) are arranged on the periphery of the enclosure (120).

4. The ice avalanche-type glacial lake outburst surge generation and height measurement device according to claim 1, wherein a baffle plate (141) is arranged on each ice avalanche frame (140), and one end of the piston rod of one of the dampers (380) faces the baffle plate (141).

5. The ice avalanche-type glacial lake outburst surge generation and height measurement device according to claim 1, wherein ice avalanche slide rails (142) are uniformly arranged in each ice avalanche frame (140), and the ice avalanche sliders (320) slide on surfaces of the ice avalanche slide rails (142).

6. The ice avalanche-type glacial lake outburst surge generation and height measurement device according to claim 1, wherein suspension pulleys (331) are uniformly and rotationally arranged on each suspension pulley frame (330), a guide slide rail (311) is arranged on a periphery of the guide frame (310), and the suspension pulleys (331) run through the guide slide rail (311) in a sliding manner.

7. The ice avalanche-type glacial lake outburst surge generation and height measurement device according to claim 1, wherein a limit clamping plate (341) is arranged at one end of the piston rod of each limit cylinder (340), and faces into a corresponding suspension pulley frame (330).

8. The ice avalanche-type glacial lake outburst surge generation and height measurement device according to claim 1, wherein a traction rope base (321) is arranged on one of the ice avalanche sliders (320), and the other end of the traction rope (370) is wound in the traction rope base (321).

9. The ice avalanche-type glacial lake outburst surge generation and height measurement device according to claim 1, wherein chute seats (322) are uniformly arranged on each ice avalanche slider (320), and the traction rope (370) runs through the chute seats (322) in a sliding manner.

10. The ice avalanche-type glacial lake outburst surge generation and height measurement device according to claim 1, wherein a pulling wheel (351) is fixedly sleeved on the traction shaft (350), and one end of the traction rope (370) is wound around a surface of the pulling wheel (351).

* * * * *